United States Patent [19]

Samdi et al.

[11] Patent Number: 5,008,092

[45] Date of Patent: Apr. 16, 1991

[54] HOMOGENEOUS POWDERS OF YTTRIUM-STABILIZED QUADRATIC ZIRCONIA

[75] Inventors: Azzdddine Samdi, Casablanca; Rene Paris, Lyons; Marc Roubin, Meyzieu, all of France

[73] Assignee: Rhone-Poulenc Chimie, Courbevoie, France

[21] Appl. No.: 250,835

[22] Filed: Sep. 29, 1988

[30] Foreign Application Priority Data

Sep. 29, 1987 [FR] France .................................. 87 13421

[51] Int. Cl.$^5$ .............................................. C01F 17/00
[52] U.S. Cl. ...................................... 423/263; 423/266; 423/608; 501/134; 501/152
[58] Field of Search .................... 423/263, 266, 608; 501/152, 134

[56] References Cited

U.S. PATENT DOCUMENTS

| | | |
|---|---|---|
| 3,573,107 | 3/1971 | Paris et al. |
| 3,983,077 | 9/1976 | Fuller et al. .......................... 501/137 |
| 4,094,690 | 6/1978 | Morton ................................. 501/128 |
| 4,576,836 | 3/1986 | Colmet et al. ....................... 423/255 |
| 4,627,966 | 12/1986 | Micheli ................................ 423/608 |
| 4,639,356 | 1/1987 | O'Toole et al. ..................... 423/608 |
| 4,654,048 | 3/1987 | Braun et al. ......................... 501/127 |
| 4,695,439 | 9/1987 | Ritsko et al. ........................ 423/608 |
| 4,713,233 | 12/1987 | Marsh et al. ........................ 423/266 |
| 4,731,234 | 3/1988 | Wada et al. ......................... 423/280 |
| 4,738,874 | 4/1988 | Berardo et al. ..................... 423/247 |
| 4,772,511 | 9/1988 | Wood et al. ......................... 501/103 |
| 4,778,671 | 10/1988 | Wusirika ............................. 423/608 |
| 4,786,486 | 11/1988 | Guelen et al. ...................... 423/608 |
| 4,816,239 | 3/1989 | Wadä et al. ......................... 423/608 |

FOREIGN PATENT DOCUMENTS

| | | |
|---|---|---|
| 0251537 | 1/1988 | European Pat. Off. . |
| 60-215527 | of 0000 | Japan . |
| 59-227725 | of 0000 | Japan . |
| 59-232920 | of 0000 | Japan . |

*Primary Examiner*—Melvyn J. Andrews
*Attorney, Agent, or Firm*—Burns, Doane, Swecker & Mathis

[57] ABSTRACT

Finely divided homogeneous powders of yttrium-stabilized, essentially quadratic zirconia have a narrow particle size distribution, and are prepared by (a) adjusting the pH of a mixed aqueous solution of zirconyl and yttrium acetates to a value of at least 5, (b) eliminating the solvent from such mixed aqueous solution, and (c) pyrolyzing the solid residue resulting from the step (b).

23 Claims, No Drawings

HOMOGENEOUS POWDERS OF YTTRIUM-STABILIZED QUADRATIC ZIRCONIA

BACKGROUND OF THE INVENTION

1. Field of the Invention

The present invention relates to finely divided zirconia powders stabilized with yttrium values, and to an improved process for the production thereof.

2. Description of the Prior Art

Stabilized zirconia, and in particular zirconia stabilized with yttrium, are materials widely used in the preparation of ceramic compositions, notably to provide high mechanical, thermomechanical and electrical properties.

It is known to this art that the best mechanical and thermomechanical properties are provided by a monophasic zirconia consisting of metastable quadratic grains obtained by incorporating predetermined amounts of yttrium oxide into the zirconia lattice.

Dense shaped articles of stabilized zirconia are produced by sintering powders of an appropriate composition, but it is readily apparent that any improved properties thereof are directly proportional to the quality of the starting material powder itself. The production of a good ceramic shaped article from a poor powder is a problem that has remained elusive, even to this date.

More particularly, the initial powders must be of very high quality, i.e., highly reactive, of good purity and must be present in a quadratic form with a perfectly homogeneous distribution of the yttrium oxide within the zirconia.

These latter requirements are important such as not to produce, after sintering, a stabilized zirconia of the polyphasic type, i.e., having, in addition to the desired quadratic phase, more than an insignificant amount of parasite, in particular monoclinic phases.

On the other hand, from an industrial point of view, it is important that the synthesis of the powders be easy and readily carried out at temperatures as low as possible, and at an attractive cost.

Several processes are currently known to this art for the preparation of fine powders of stabilized zirconia.

One of the oldest processes consists of reacting, in the solid state, an intimate admixture of fine powders of zirconium oxide and an oxide of a stabilizing element, for example $Y_2O_3$. However, this method has the disadvantage of being based on diffusion reactions between crystalline solids which are both slow and difficult, requiring very high temperatures and frequently involving the risks, on the one hand, of formation of heterogeneous solid solutions, and, on the other, of the introduction of undesirable impurities during the subsequent grinding stage, which is typically necessary after calcination.

More recently, it has been discovered that it is also possible to conduct a pyrolysis of precursors obtained by various different reactions which occur in the liquid phase.

Such processes generally described in the literature and based on this principle consist of mixing aqueous solutions of zirconium or a zirconyl salt with a salt of a stabilizing compound (sulfate, chloride, nitrate, etc.), then coprecipitating the two metals in the form of their hydroxides by addition of ammonia or an alkaline base, separating the coprecipitates from the resulting reaction medium, and pyrolyzing such coprecipitates.

The hydroxide precipitates are typically present in the form of amorphous gels, or aggregates of poorly crystallized fine crystals.

However, this type of method has several disadvantages. First, the hydroxide gels can absorb ions in more or less large amounts and these impurities, which are never eliminated completely in the washing of the precipitates, remain in the oxides after the dehydration heat treatment, with the exception of the sufficiently volatile species.

Secondly, the presence of water during the dehydration of the hydroxides favors the crystallization of the latter, such that their reactivity declines and the solid solution completely forms only at temperatures higher than 1,000° C.

Finally, with this method it is not possible to control the size of the precipitates, such that the pyrolysis of the latter typically results in particles, the size distribution of which is relatively heterogeneous.

Another more favorable method entails pyrolyzing the solid precursors consisting of a homogeneous mixture or organic complexes of the carboxylate type (acetates, formates, citrates, and the like) of zirconium and the stabilizing compound, said precursors being produced by the evaporation of an aqueous mixture of the corresponding salts.

This method, described in published French Application No. 1,558,466, has the advantage of enabling the production of solid solutions at relatively low temperatures and directly in the form of fine powders.

Nonetheless, in following the teachings of FR No. 1,558,466 to produce a zirconia powder stabilized with yttrium, it has not been possible to prepare an essentially monophasic solid solution of the quadratic type.

SUMMARY OF THE INVENTION

Accordingly, a major object of the present invention is the provision of a simple, effective and readily applicable process for producing, both reliably and reproducibly, finely divided zirconia powders stabilized with yttrium values, essentially in the quadratic form and having a grain size distribution as narrow as possible, as well as a markedly homogeneous distribution of the stabilizing element within the zirconia.

By "essentially in the quadratic form" is intended that at least 90 molar % of the stabilized zirconia is in this particular phase.

Briefly, the present invention features the preparation of such yttrium-stabilized zirconia powders, by:

(a) preparing an aqueous admixture of zirconyl acetate and yttrium acetate;

(b) adjusting the pH of such admixture to a value equal to at least 5;

(c) removing the solvent from such admixture;

(d) pyrolyzing the solid residue produced in stage (c); and whereby a fine yttrium-stabilized zirconia powder is thus obtained, essentially completely in the quadratic state.

DETAILED DESCRIPTION OF THE PREFERRED EMBODIMENTS OF THE INVENTION

More particularly according to the present invention, it has now unexpectedly and surprisingly been demonstrated that controlling the pH of the mixture containing the acetates of zirconyl and yttrium constitutes a critical parameter that is essential for producing fine stabilized zirconia powders in the quadratic state.

The beginning aqueous admixture may be prepared either by the direct introduction and the subsequent dissolution of solid acetates of zirconium and yttrium in water, or by mixing together the two distinct aqueous solutions of said salts.

Zirconyl and yttrium acetates, in the solid form or in solution, are conventional commercial materials and thus are easily synthesized.

The amounts of zirconium and yttrium introduced into the reaction medium must be in the ratio desired for the final solid solution.

In actual practice, the ratio of the molar concentrations between zirconyl acetate and yttrium acetate contained in the beginning aqueous mixture is selected such that the yttrium content (expressed in $Y_2O_3$) of the stabilized zirconia powder ranges from 0.001 to 10 molar %, preferably from 1.5 to 6 molar %, and even more preferably from 2 to 4 molar %.

After homogenization, the pH of the mixture is approximately 4.6.

In an essential characteristic of the invention, the pH of the mixture is then adjusted to a value of at least 5.

This operation may be carried out by any known means, in particular by the addition of a base, such as gaseous ammonia or a solution of ammonia.

During the addition of the basic agent, it is preferable to avoid any local over-concentration, which could have the effect of generating local and instantaneous increases in the pH of the reaction medium.

The homogeneity of pH in this medium may be attained, for example by using a highly dilute ammonia solution or a flowstream of very weak gaseous ammonia.

However, in a particular and preferred embodiment of the invention, ammonia is formed "in situ" in the reaction medium, for example by introducing urea into said medium, which, by decomposing at elevated temperatures, yields ammonia according to the following reaction scheme:

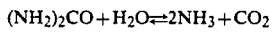
$$(NH_2)_2CO + H_2O \rightleftharpoons 2NH_3 + CO_2$$

After the pH has been adjusted to the desired value, the solvent is removed.

This operation may be carried out by any known means, in particular by evaporation at an elevated temperature, or in a vacuum.

Preferably, the solvent is eliminated by slow evaporation at an elevated temperature on a bath of sand maintained at a temperature of from 60° to 90° C.

Upon completion of this stage, a solid white residue is recovered, which is amorphous by X-ray analysis and corresponds to a true mixed zirconium/yttrium acetate displaying a homogeneous distribution of yttrium values within the zirconium acetate lattice.

Without intending to limit the present invention to any particular theory, it is believed that the amorphous and perfectly homogeneous nature of the solid precursor is the reason for its remarkable behavior during pyrolysis, to produce solid $ZrO_2/Y_2O_3$ solutions that are quadratic and perfectly homogeneous.

The solid residue obtained in this manner is then pyrolyzed. Such pyrolysis is carried out perfectly in an oxidizing atmosphere, for example in air, in order to favor the elimination of carbon. The pyrolysis temperature advantageously ranges from 800° C. to a temperature corresponding to the onset of sintering between and among the grains. The upper temperature limit is generally about 1,100° C. Preferably, the temperature of pyrolysis ranges from 850° to 1,000° C.

Granulometric analysis of the powder resulting from this pyrolysis shows that it consists of agglomerates of a diameter of from 0.5 $\mu$m to 10 $\mu$m, with a mean value ranging from 2 to 3 $\mu$m.

Analysis by electron microscopy shows, on the other hand, that such agglomerates are fine aggregates, having a particle size ranging from 0.1 to 1.3 $\mu$m, with a mean value of from 0.1 to 0.3 $\mu$m, said aggregates being elementary crystallites of a size of from 100 to 300 Å.

It is also observed, by radiocrystallographic analysis, that the powders are essentially, or entirely in the quadratic form (absence of the monoclinic and $Y_2O_3$ phase). X-ray microanalysis evidences a very homogeneous distribution of the yttrium in the zirconia lattice.

The powders produced according to this invention are very suitable for compaction and are particularly well suited for producing, by sintering at temperatures of from 1,200° to 1,500° C., solid and dense shaped articles of metastable quadratic zirconia containing stabilizing amounts of yttrium values.

In order to further illustrate the present invention and the advantages thereof, the following specific examples are given, it being understood that same are intended only as illustrative and in nowise limitative.

EXAMPLES (A) Common operating procedure

This procedure entailed evaporating an aqueous solution of the acetates containing the amounts of zirconium and yttrium in the ratio desired for the final solid solution.

A solution of yttrium acetate was prepared by dissolving yttrium oxide in nitric acid, then eliminating the nitrate ions by the addition of acetic anhydride. This solution was then mixed with a commercial zirconyl acetate solution, 22 g $ZrO_2$ per liter (marketed by Riedel-De Haen), and the mixture was then evaporated on a sand bath at 80°–90° C.

The white solid obtained was decomposed by calcination in air, in either one or more stages, at a temperature of from 900° to 1,000° C.

(B) Comparative Examples 1 to 7:

These examples illustrate the process as described in FR No. 1,558,466.

The natural pH of the mixture was 4.6. In certain examples, it was adjusted to 2 by the addition of acetic acid.

The results of these comparative examples are reported in Table I:

TABLE I

| Example | Yttrium content in mixture (%) | pH | Temperature of pyrolysis (°) | Duration (h) | Phases Observed | | |
|---|---|---|---|---|---|---|---|
| | | | | | $ZrO_2$ (M) | $ZrO_2$ (C) and/or (Q) | $Y_2O_3$ |
| 1 | 1.59 | 2 | 930 | 1 | 67 | 33 | — |
| 2 | 3.15 | 2 | 930 | 1 | 59 | 41 | — |
| 3 | 5.83 | 2 | 930 | 1 | 56 | 44 | — |

TABLE I-continued

| Example | Yttrium content in mixture (%) | pH | Temperature of pyrolysis (°) | Duration (h) | Phases Observed ZrO₂ (M) | ZrO₂ (C) and/or (Q) | Y₂O₃ |
|---|---|---|---|---|---|---|---|
| 4 | 6.76 | 4.6 | 1,000 | 0 | 83 | 12 | 5 |
| 5 | 9.52 | 4.6 | 1,000 | 0 | 64 | 27 | 9 |
| 6 | 21.4 | 4.6 | 930 | 1 | 61 | 16 | 23 |
| 7 | 26.4 | 4.6 | 930 | 1 | 69 | 7 | 24 |

N.B.:

(1) The amount of yttrium in the mixture is expressed as the molar percentage relative to the sum of yttrium+zirconium:

([Y]/[Y]+[Zr])

(2) The phases in the residue of pyrolysis were determined by radiocrystallographic analysis (C=cubic; Q=quadratic; M=monoclinic). They are expressed in molar percentages.

These examples clearly show the impossibility of producing yttrium-stabilized zirconia powders essentially in the quadratic form in accordance with the prior art teachings.

(C) Examples 8 to 13:

These examples illustrate the improved process according to the invention.

The pH of the initial mixture was adjusted by the addition of dilute ammonia.

The pyrolysis was carried out at 930° C., with the pyrolysis being conducted for one hour at this temperature.

The results of these examples are reported in Table II:

TABLE II

| Example | Yttrium content in the mixture (%) | pH | Phases Observed ZrO₂ (M) | ZrO₂ (Q) | Y₂O₃ |
|---|---|---|---|---|---|
| 8 | 1.59 | 5 | 10 | 90 | — |
| 9 | 1.59 | 7 | 5 | 95 | — |
| 10 | 3.15 | 5 | 1 | 99 | — |
| 11 | 3.15 | 7 | 0 | 100 | — |
| 12 | 5.83 | 5 | 0 | 100 | — |
| 13 | 5.83 | 7 | 0 | 100 | — |

These examples clearly demonstrate that with pH values of at least 5, it was possible to produce yttrium-stabilized zirconia powders with more than 90% thereof being in the quadratic form, such value increasing to as high as 100% in certain of the examples.

It was further noted that the process according to the invention enabled production of solid solutions of the quadratic type at relatively low pyrolysis temperature.

(D) Characterization of the yttrium-stabilized zirconia according to the invention The measurements were carried out using the powder produced in Example 13.

1. Morphology

The grain size analysis of the powder evidenced that the powder consisted of agglomerates having a diameter ranging from 0.6 to 9 μm, with a mean diameter of about 2.0 μm.

Electron microscopy indicated that these agglomerates consisted of aggregates of a size of from 0.1 to 1.3 μm, with a mean value of approximately 0.2 μm; these aggregates themselves consisted of elementary crystals having a mean size of about 200 Å.

2. Porosimetry Tests

These tests were carried out using the same powder previously compacted under 40 bars, by means of a mercury porosimeter to a pressure of 2,000 bars. These tests provided additional information concerning the open porosity of the powders:

Pore volume: 0.115 cm³/g
Pore size: 7,500 Å
Specific surface: 1.1 m²/g

The results indicated that only a single population of open pores exists within a range of 75 Å–10 μm.

3. Measurement of the homogeneity of the solid solution

The method consisted of observing, by X-ray microanalysis, the homogeneity of the distribution of yttrium within the zirconia lattice, by determining the proportions of yttrium and zirconium in several agglomerates (A and B) and then carrying out the same measurements on different zones of each agglomerate.

The results of this microanalysis are reported in Table III:

TABLE III

| Zone analyzed | (*) Y % by weight | (*) Zr % by weight |
|---|---|---|
| All of agglomerate A | 6.47 | 93.53 |
| Portions of the same agglomerate A | 6.46 | 93.54 |
| | 7.09 | 92.91 |
| | 6.95 | 93.05 |
| | 5.49 | 94.51 |
| All of agglomerate B | 6.22 | 93.78 |
| Portions of the same agglomerate B | 7.58 | 92.42 |
| | 6.12 | 93.88 |
| | 7.42 | 92.58 |
| | 5.99 | 94.01 |
| | 7.15 | 92.85 |

*percentages are expressed relative to the sum of yttrium + zirconium

These results clearly show the very good distribution of the yttrium within the zirconia lattice. This homogeneity in the powder is a prerequisite for producing a sintered stabilized zirconia which itself is perfectly homogeneous.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a homogeneous powder of yttrium-stabilized, substantially quadratic zirconia, comprising (a) adjusting the pH of a mixed aqueous solution of zirconyl and yttrium acetates to a value of at least 5 so as to form a soluble mixed acetate of yttrium and zirconium, (b) eliminating solvent from such mixed aqueous solution so as to produce a solid residue of zirconium/yttrium acetate, and (c) pyrolyzing the solid residue resulting from said step (b) so as to produce a homogeneous powder of yttrium-stabilized, substantially quadratic zirconia.

2. The process as defined by claim 1, wherein the amount of yttrium present in said stabilized substantially quadratic zirconia, expressed as $Y_2O_3$, ranges from 1.5 to 6 molar percent.

3. The process as defined by claim 2, said amount of yttrium ranging from 2 to 4 molar percent.

4. The process as defined by claim 1, comprising adjusting the pH of said mixed aqueous solution by adding a base thereto in an amount effective to raise the pH to a value of at least 5.

5. The process as defined by claim 4, wherein said base comprises ammonia.

6. The process as defined by claim 4, comprising adjusting the pH of said mixed aqueous solution by in situ decomposition of urea therein.

7. The process as defined by claim 1, comprising eliminating the solvent by evaporation.

8. The process as defined by claim 7, comprising evaporating at a temperature of from 60° to 90° C.

9. The process as defined by claim 1, comprising pyrolyzing in an oxidizing atmosphere.

10. The process as defined by claim 9, wherein said oxidizing atmosphere comprises air.

11. The process as defined by claim 1, comprising pyrolyzing at a temperature of from 800° to 1,100° C.

12. The process as defined by claim 11, comprising pyrolyzing at a temperature of from 850° to 1,000° C.

13. The process as defined by claim 1, wherein said pH in step (a) is adjusted to a value at which precipitation of yttrium and zirconium does not occur.

14. The process as defined by claim 1, wherein said pH is adjusted by adding a base in step (a) to raise said pH to at least 5, said base being added such that local and instantaneous increases in said pH value are avoided.

15. The process as defined by claim 14, wherein said pH is adjusted by adding a highly dilute ammonia solution.

16. The process as defined by claim 14, wherein said pH is adjusted by adding a flowstream of very weak gaseous ammonia.

17. The process as defined by claim 14, wherein said pH is adjusted by adding urea.

18. The process as defined by claim 1, wherein upon completion of step (b), a solid residue comprising an amorphous mixed zirconium/yttrium acetate having a homogeneous distribution of yttrium values within a zirconium acetate lattice is obtained.

19. The process as defined by claim 1, wherein upon completion of step (c), a powder comprising a solid solution of zirconium and yttrium oxide is obtained.

20. The process as defined by claim 1, wherein upon completion of step (c), a powder comprising a solid solution of zirconium and yttrium oxide with at least 90 molar % of the powder being in the quadratic form and absent monoclinic $ZrO_2$ and $Y_2O_3$ phases is obtained.

21. The process as defined by claim 1, wherein upon completion of step (c), a powder comprising a solid solution of zirconium and yttrium oxide free of $Y_2O_3$ as a separate phase is obtained.

22. The process as defined by claim 1, wherein upon completion of step (c), a fine grained powder comprising aggregates having a mean particle size ranging from 0.1 to 0.3 mm is obtained.

23. The process as defined by claim 1, wherein the powder produced as a result of step (c) includes at least 90 molar % yttrium-stabilized quadratic zirconia.

* * * * *